United States Patent

[11] 3,604,484

| [72] | Inventor | Cornelius J. Viljoen<br>Alberton, Transvaal, Republic of<br>South Africa |
|---|---|---|
| [21] | Appl. No. | 818,950 |
| [22] | Filed | Apr. 24, 1969 |
| [45] | Patented | Sept. 14, 1971 |
| [73] | Assignee | Reliance Export Company (Proprietary)<br>Limited |
| [32] | Priority | Apr. 29, 1969, Oct. 11, 1969 |
| [33] | | Republic of South Africa |
| [31] | | 68/6585 and 68/2709 |

[54] WOOD-WORKING MACHINES WITH VERTICAL SPINDLE
3 Claims, 7 Drawing Figs.

[52] U.S. Cl............................................. 144/133,
144/134, 144/87, 144/198
[51] Int. Cl............................................. B27f 1/04,
B27c 5/00
[50] Field of Search........................................ 144/133,
136, 134, 87, 85, 253; 143/169

[56] References Cited
UNITED STATES PATENTS

| 41,992 | 3/1864 | Hartwell........................ | 144/87 |
| 278,815 | 6/1883 | Orum............................ | 144/253 (.9) |
| 322,237 | 7/1885 | Adams.......................... | 144/133 |
| 1,789,125 | 1/1931 | Wilderson.................... | 143/169 X |

*Primary Examiner*—Donald R. Schran
*Attorneys*—Sewall P. Bronstein and Donald Brown ABSTRACT: A woodworking machine which is more adaptable for different operations on the workpiece. A tool bit extends vertically through the table and turns about an axis substantially vertical to the table plane. To facilitate operations on the workpiece the table consists of two plates, the top plate being slidable in reciprocating fashion over the bottom plate, and mounted on the top plate are two fences which are adjustable relative to each other and the tool bit.

WOOD-WORKING MACHINES WITH VERTICAL SPINDLE

This invention relates to a woodworking machine.

Machines are known in which a vertical rotating spindle carries a chuck in which is held a tool for cutting slots, grooves or rebates. The nature of the tool varies with the nature of the cut to be made in a piece of wood. However, once a machine has been set up to cut one kind of groove, it cannot readily be changed to cut another type of groove.

An object of the invention is to provide an attachment for the known kind of machines which will render it more versatile than before.

According to the invention the machine includes a base through which the tool is adapted to project, a plate movable across the base, interengaging formations on the plate and base constraining the plate to reciprocate across the base in one direction, a tool hole in the base, a slot in the plate substantially parallel with the direction of reciprocation of the plate and registering in at least some positions of the plate with the tool hole, a first fence adapted for anchorage to the plate in fixed location relative thereto, and a second fence disposed substantially parallel to the direction of reciprocation and having a zone of height less than the maximum depth of finger slots to be cut on the machine.

Further according to the invention the second fence is adjustably located relative to the length of the first fence.

Also according to the invention the location of the first fence is adjustable in an arcuate path.

According also to the invention a gap between the plate and first fence permits the tool to pass beneath the fence.

In a preferred form of the invention means is provided to clamp the plate and base. Preferably stop means is provided to regulate the extent of plate movement over the base.

In order to illustrate the invention an example is described below with reference to the accompanying drawings, in which.

Figure 1:
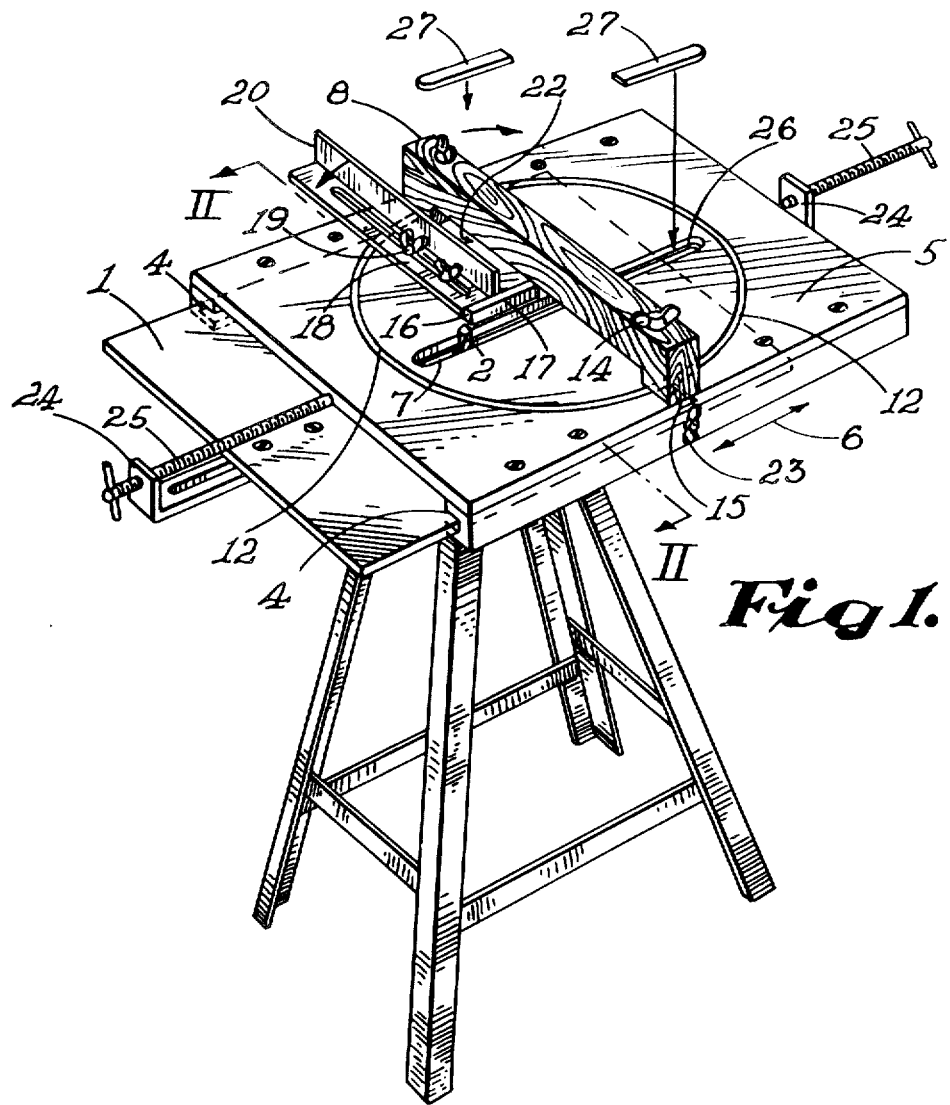
FIG. 1 is a perspective view of a machine in accordance with the invention.
Figure 2:
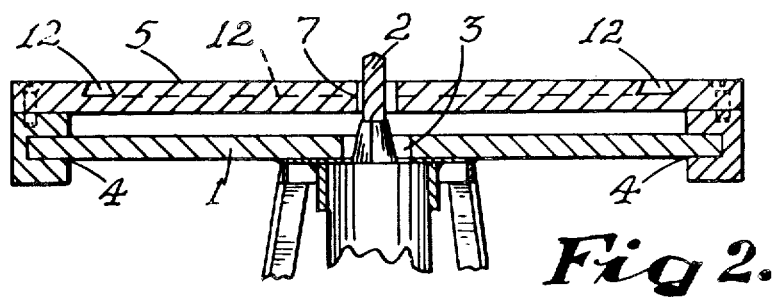
FIG. 2 is a sectional view of the machine along lines II—II of FIG. 1.
Figure 3:
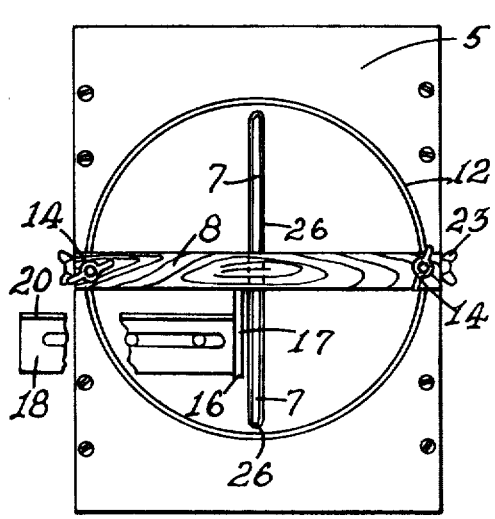
FIG. 3 is a plan view of the machine showing the plate in position over the base.
Figure 4:
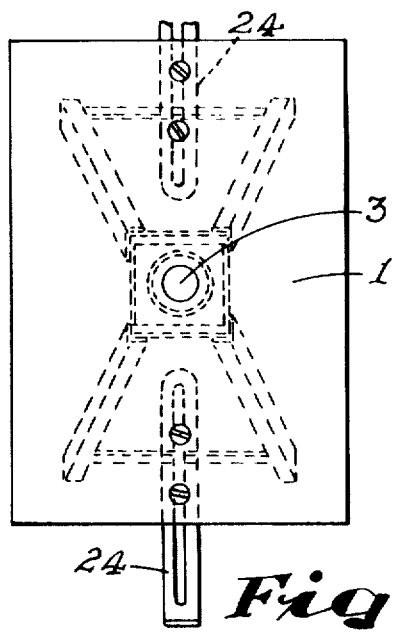
FIG. 4 is a plan view of the machine with the plate removed.

Referring to the drawings the machine is provided with a base 1 from which a tool 2 projects through hole 3. Mounted above the base by means of interengaging formations 4, there is a plate 5 which is arranged to slide in reciprocating fashion as indicated by arrows 6. As the plate 5 moves relative to the base the tool 2 rides in a slot 7 which is provided in the surface of plate 5, the direction of the slot being substantially parallel with the direction of reciprocation. In this fashion the slot 7 registers with the hole 3 in at least some positions of the plate 5.

Figure 5:
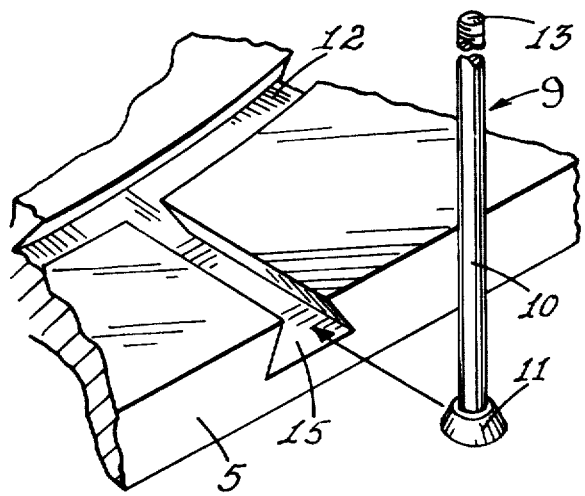
FIG. 5 is a perspective view showing in detail the slot and screw mechanism which permits anchorage of the first fence to the plate.
Figure 6:
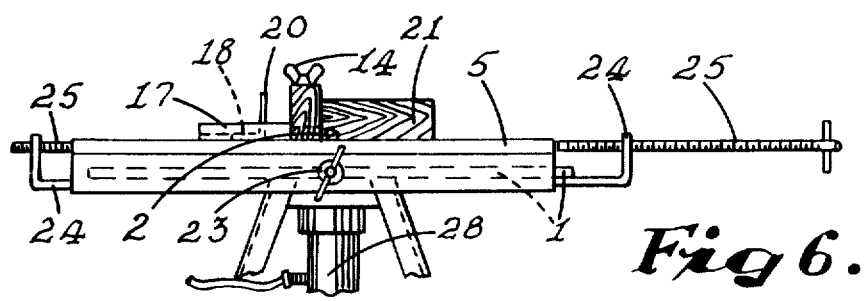
FIG. 6 is a side view of the machine having the motor driving the tool.

A fence 8 (shown in the drawings at right angles to the direction of reciprocation 6) is provided on the plate 5 in a manner that it may be anchored as required in fixed location with this plate. This anchorage is simply effected by bolts 9, the shanks 10 of which pass through bored zones in the fence 8, the heads 11 being trapped in a circular slot 12 provided in the plate surface 5. The free ends 13 may be locked with a butterfly nut 14 thereby to effect the anchorage of fence 8 to plate 5. In FIG. 5 a bolt 9 is shown in a position adjacent slot 15 which is used for locating the bolt 9 in the circular slot 12 on the plate surface 5.

Figure 7:
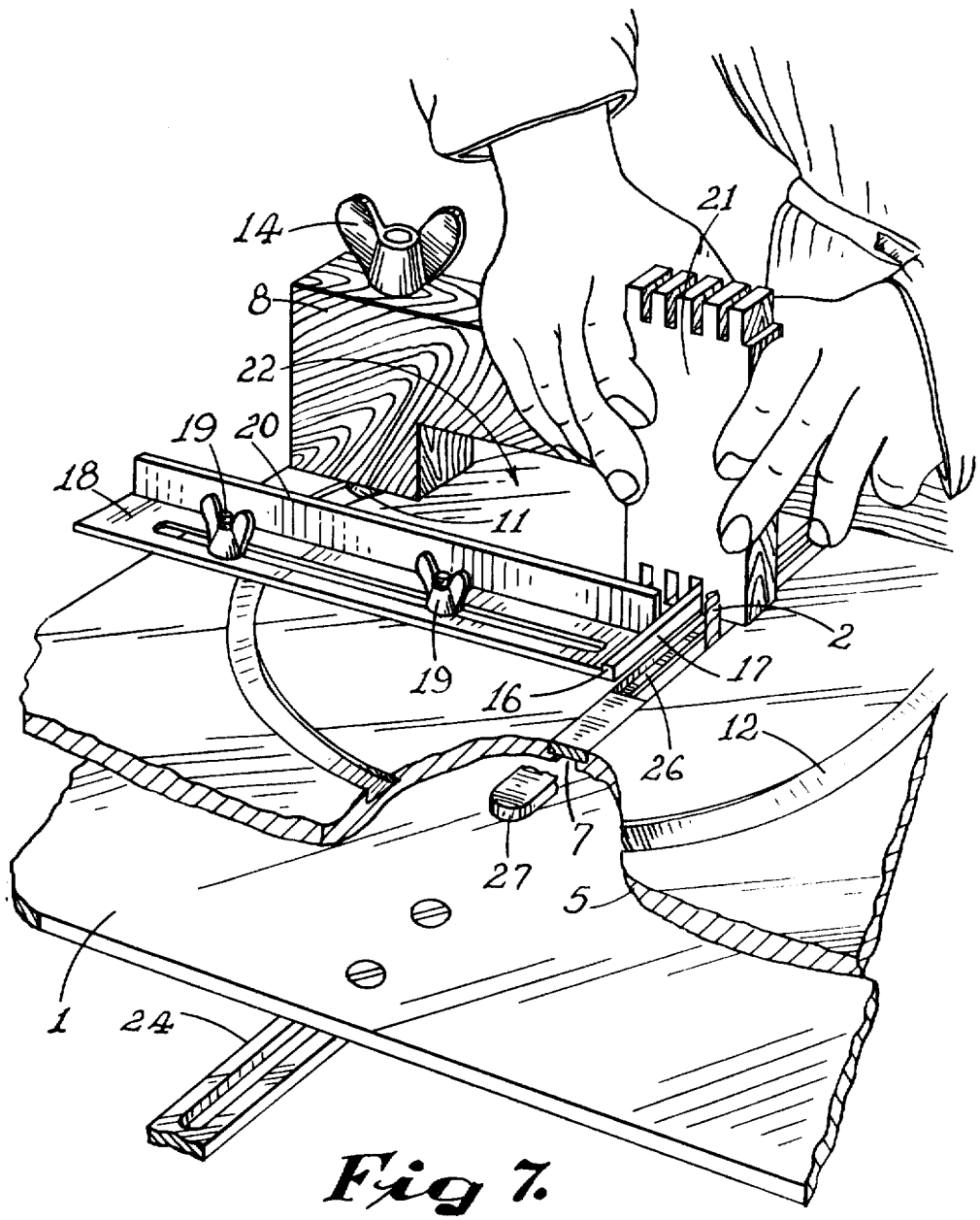
FIG. 7 is a perspective view with parts broken away showing a workpiece in position on the plate.

Also disposed on the plate 5 there is a second fence 16 which is substantially parallel positioned relative to the reciprocating direction 6. This fence 16 has a zone 17 with height less than the maximum depth of a finger slot to be cut on a workpiece by the machine. Plate 18 which is connected to the frame 16 provides means for anchoring the fence 16 in the required position on plate 5 through bolt and nut means 19. Also as part of the construction of the fence 16 there is a second plate 20 which is disposed at right angles to fence 16 and plate 18. The space between plate 20 and fence 8 is sufficient for a workpiece 21 to fit between the plate 20 and fence 8 as shown in FIG. 7.

A section is cut from the bottom of fence 8 so that a gap 22 is provided for the tool 2 to pass below the fence 8 as required. This gap 22 extends substantially over the length of the fence 8 so that when the fence 8 is in a position parallel to the slot 7 the movement of the plate 5 will be unhindered by the fence 8.

Clamping bolts 23 are disposed at both sides of the plate 5 so that the plate 5 and base 1 may be held together for some operations of the machine. In such cases the workpiece 21 may be moved along one or other fence 8 or 16 as required.

Regulating the movement of plate 5 relative to the base 1 is effected by the arms 24 which are connected to either end of base 1 so that threaded locator shanks 25 may be moved inwardly and outwardly as necessary.

In slots 7 there is provided a stepped zone 26 which permits location of elongated plates 27 in slot 7 in cases where it is desirable to seal the slot 7.

In operation of the machine a workpiece 21 is located relative to the tool 2 and the fence 8 and 16 are adjusted to a position wherein the desired work can be effected on the workpiece 21. The tool 2 rotates at an angle relative to the plane of the base 1 by means of drive motor 28 mounted below the base 1. The tool bit 2 in the chuck mounted on the motor shaft (not shown) may have any shape suitable for the desired purposes. In certain cases it may also be desirable to mount the motor in a manner that it may swivel relative to the plane of the plate 5. Likewise the depth of the slot or the like to be cut into the workpiece 21 may be adjusted simply be varying the height of motor 28 relative to the plate 5.

Finger slots or dovetail slots may be cut in the workpiece 21 by moving the workpiece 21 relative to the tool 2 by imparting a reciprocating action to the plate 5 as the workpiece 21 is held against fence 8. A series of slots is developed in equal spaced relationship by using fence 16 and in particular zone 17 to locate the workpiece 21 as the tool 2 cuts further slots in the workpiece. In this regard FIG. 7 illustrates clearly how the fences 8 and 16 are used for this purpose.

By adjusting fence 16 to a position at the edge of slot 7 a workpiece may be disposed adjacent the tool 2 in abutting relationship with fences 8 and 16 thereby to permit rebates, tranches or grooves to be formed in the workpiece.

I claim:

1. A wood working machine including a base defining an orifice through which a rotatable wood working tool projects, a plate reciprocable across the base in a predetermined line of reciprocation, a slot in the plate substantially parallel to the line of reciprocation and registering with the orifice in at least some positions of the plate on the base, a track in the plate with sections flanking the slot, a first fence spanning the slot and having shoes attached thereto for supporting the first fence on the track in the plate, said first fence adapted to be positioned through a range of spanning positions with respect to the slot, means for anchoring the first fence in any desired position on the track, a second fence connected to a frame which is clampable to the plate, said second fence and frame movable toward and away from said slot, said frame including a sidewall plate surface facing said first fence and separated therefrom a distance sufficient to permit a workpiece to be positioned between said plate surface and said first fence, said first fence having a section removed therefrom so that a gap is provided for the tool to pass below the first fence, the height of the gap measured from the plate surface is greater than the height of the second fence.

2. A machine according to claim 1 in which the plate surface is at right angles to the second fence.

3. A machine according to claim 1 in which the plate surface is a flange.